United States Patent Office 3,530,183
Patented Sept. 22, 1970

3,530,183
DIBENZOCYCLOHEPTENES
Emilio Kyburz, Rienach, and Hans Spiegelberg, Basel, Switzerland, assignors to Hoffmann-La Roche Inc., Nutley, N.J., a corporation of New Jersey
No Drawing. Filed Dec. 30, 1965, Ser. No. 517,788
Claims priority, application Switzerland, Jan. 6, 1965, 110/65
Int. Cl. C07c 103/34
U.S. Cl. 260—562   3 Claims

ABSTRACT OF THE DISCLOSURE

Dibenzo[a,d]cycloheptenes bearing a secondary or tertiary amino group at position-5, prepared, inter alia, from the corresponding 5-halo compounds, are described. The end products are useful as psychostimulants.

---

The present invention relates to novel compositions of matter. More particularly, the present invention relates to novel derivatives of dibenzocycloheptene.

In one comprehensive embodiment, this invention comprises a compound of the general formula

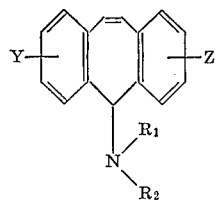

I wherein Y and Z each is, individually, hydrogen, halogen, lower alkyl, lower alkoxy, trifluoromethyl, lower alkylmercapto, lower alkanoyl, sulfamoyl, lower alkyl sulfamoyl or lower alkyl sulfonyl; $R_1$, individually, is hydrogen, lower alkyl, lower alkoxy-lower alkyl, amino-lower alkyl, lower alkylamino-lower alkyl, di(lower alkyl)-amino-lower alkyl, or phenyl-lower alkyl; $R_2$, individually, is hydrogen, lower alkyl, cyclo-lower alkyl, lower alkoxy-lower alkyl, amino-lower alkyl, lower alkylamino-lower alkyl, di(lower alkyl)amino-lower alkyl, phenyl, lower alkylphenyl, phenyl-lower alkyl, lower alkanoyl, halo-lower alkanoyl, amino-lower alkanoyl, lower alkylamino-lower alkanoyl or di(lower alkyl)amino-lower alkanoyl; and $R_1$ and $R_2$, together with the nitrogen atom, is a heterocyclic ring of 5 to 6 members or a heterocyclic ring of 5 to 6 members having a lower alkyl substituent; and pharmaceutically acceptable acid addition salts thereof.

The compounds of the present invention are useful as psychostimultants. They are useful, for example, in alleviating or preventing both exogenous and endogenous depression of the central nervous system. The compounds of Formula I are particularly useful in reversing the effect of reserpine and in effecting a direct central nervous system stimultant action.

The substituents on each of the benzene rings of the compounds of Formula I can be one or more halogen atoms, e.g., fluorine, chlorine, bromine and iodine, especially preferred are chlorine and bromine; straight or branched chain lower alkyl groups with up to 7 carbon atoms, e.g., methyl, ethyl, butyl, hexyl; lower alkoxy groups with up to 7 carbon atoms, e.g., methoxy, ethoxy, heptoxy; lower alkylmercapto groups with up to 7 carbon atoms, e.g., methylmercapto, ethylmercapto; acyl groups, e.g., lower alkanoyl or lower alkylsulfonyl groups with up to 7 carbon atoms, e.g., acetyl, caproyl, methylsulfonyl or hexylsulfonyl; sulfamoyl or lower alkylsulfamoyl, e.g., methylsulfamoyl.

The $-NR_1R_2$ substituent in the 5-position of the compounds of Formula I can represent, aside from a free amino group, i.e., wherein $R_1$ and $R_2$ are each hydrogen, groups such as lower alkylamino, e.g., methyl, ethyl, isopropyl, butyl or hexylamino; lower aralkylamino, e.g., benzylamino, phenylhexylamino; lower alkarylamino, e.g., butylphenylamino; lower alkaralkylamino, e.g., methylbenylamino; cyclo-lower alkylamino, e.g., cyclopropylamino, N-methyl-cyclopropylamino, cyclobutylamino, N-ethyl-cyclobutylamino, N-benzyl-cyclopropylamino, N-methyl-cyclopentylamino, N-benzyl-cyclohexylamino; amino substituted lower alkylamino, e.g., amino pentylamino; lower alkyl and di-lower alkylamino-lower alkylamino, e.g., methylamino-ethylamino, dimethylamino-propylamino, ethylamino-propylamino, diethylamino-hexylamino; lower dialkylamino, e.g., dimethylamino, diethylamino, N-methyl-ethylamino, N-methyl-butylamino or N-methyl-pentylamino; N-alkyl-aralkylamino, e.g., N-methyl-benzylamino, N-ethyl-4-phenylbutylamino; diaralkylamino, e.g., dibenzylamino; or substituted lower dialkylamino, e.g., di-(dimethylaminopropyl)amino, di-(methylaminopropyl)amino, di-(ethylaminohexyl)amino, diethoxy-butylamino, N-ethoxypropyl-methylamino, N-propoxymethyl-hexylamino; an acylamino group, e.g., lower alkanoylamino, e.g., acetylamino, capropylamino, halolower alkanoylamino, e.g., chloroacetylamino; aminolower alkanoylamino, e.g., aminoacetylamino; lower alkylamino-lower alkanoylamino, e.g., methylaminoacetylamino; di(lower alkylamino)lower alkanoylamino, e.g., dimethylaminoacetylamino, or an aroylamino, e.g., benzoylamino, carbamoylamino, i.e., ureido, lower alkoxycarbonylamino, e.g., ethoxycarbonylamino, N-butyl-ethoxycarbonylamino; lower alkanoylamino, e.g., acetylamino; lower alkanoyloxyamino, e.g., acetoxyamino.

In addition to representing individual substituents, as above, $R_1$ and $R_2$ can be joined together to form a 5- or 6-membered heterocyclic ring which can be substituted, e.g., by an alkyl group, for example: piperidino, piperazino, pyrrolidino, morpholino, imidazoline, 1(2H)pyrimidino, pyrazolino, pyrazolidino, methyl-piperidino, hexyl-piperidino, pentyl-morpholino, etc.

Certain compounds of Formula I are of particular value in that they possess unique and significantly better activity. Among these are compounds of Formula I wherein the nitrogen atom at the 5-position is substituted with an alkyl side chain having 5 or more carbon atoms. For example, 5-pentylamino- or 5-hexylamino-5H-dibenzo[a,d]cycloheptene possess unique and advantageous activity. Compounds of Formula I having particular value are those wherein the sum of the carbon atoms in the $R_1$ and $R_2$ substituents is at least 5 or where $R_1$ is hydrogen, lower alkyl or lower alkoxy-lower alkyl and $R_2$ is lower alkyl of 5 to 7 carbon atoms, di-lower alkyl of 5 or more carbon atoms, lower alkoxy-lower alkyl of 3 or more carbon atoms, amino-lower alkyl, lower alkylamino-lower alkyl, di-lower alkylamino-lower alkyl, phenyl-lower alkyl, cyclo-lower alkyl, halo-lower akanoyl, amino-lower alkanoyl, lower alkylamino-lower alkanoyl or di-lower alkylamino-lower alkanoyl. Also distinct and preferred are compounds of Formula I wherein $R_1$ together with $R_2$ and a nitrogen atom form a 5- or 6-membered heterocyclic ring, e.g., piperidino. Examples of compounds of Formula I which are of distinct and significant value include: 5-n-pentylamino - 5H - dibenzo [a,d]cycloheptene, 5-n-hexylamino - 5H - dibenzo [ad,] cycloheptene, 5 - benzylamino - 5H - dibenzo[a,d]cycloheptene, 5 - (3 - diethylaminopropylamino) - 5H - dibenzo[a,d] cycloheptene, 5-piperidino - 5H-dibenzo[a,d] cycloheptene, 5 - (3 - methoxypropylamino) - 5H - dibenzo[a,d]cycloheptene and 5-acetylamino - 5H - dibenzo[a,d]cycloheptene.

The compounds of Formula I can be prepared by reacting a compound of the formula

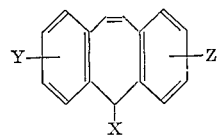

wherein X represents halogen, preferably chlorine or bromine or a RSO₃— group (wherein R is alkyl, aralkyl, alkaryl, e.g., ethyl, hexyl, phenyl, methylpenyl, benzyl) and Y and Z have the meanings given above for Formula I with an amine of the general formula

wherein $R_1$ and $R_2$ have the meanings given above for Formula I.

The compounds of Formula II can be prepared from the readily obtainable corresponding 5-hydroxy-dibenzocycloheptene, 5 - (3 - methoxypropylamino) - 5H - didibenzocycloheptene with thionyl chloride or phosphorous tribromide will yield the desired 5 - halo-dibenzocycloheptene. Treatment of a 5-hydroxy-dibenzocycloheptene with a sulfonic acid derivative, e.g., para-toluenesulfonyl chloride or methanesulfonyl chloride will yield the corresponding 5 - sulfonate-dibenzocycloheptene, e.g., para-toluenesulfonate-dibenzocycloheptene. As mentioned heretofore the 5-hydroxy-dibenzocycloheptenes are readily obtainable by reduction in a conventional manner of the corresponding known 5-keto-dibenzocycloheptenes.

The reaction of the dibenzocycloheptene intermediate of Formula II with the amine of Formula III can be conducted in the presence or absence of a solvent. When employing a solvent, it preferred to use an inert organic solvent, e.g., benzene or toluene. It is desirable to conduct the reaction at elevated temperatures, e.g., from about 20° C. to about 200° C. Most preferably, the reaction is carried out in a temperature range of from about 100° C. to about 150° C. with about 120° C. being, in general, an optimum temperature. It is advantageous to employ an excess pressure, for example, from about 5 to about 20 atmospheres. An excess pressure is particularly desirable when a low molecular weight amine of Formula III is employed. In addition, it is preferable to employ an excess quantity of the amine of Formula III, i.e., up to about 100-fold the stoichiometric quantity of amine reactant.

The compounds prepared by the above process can be further reacted to prepare a variety of derivatives. For example, the reaction products of the aforesaid process can be alkylated in a conventional manner with known alkylation agents or aralkylated with known aralkylation agents. Similarly, the amine products of the reaction of compounds of Formula II with compounds of Formula III can be acylated in a conventional manner with known acylating agents, acids or reactive acid derivatives, especially carboxylic acids. The acyl residues thus introduced an be reduced to alkyl groups if desired by reduction of the acylamino derivatives with complex metal hybrides, e.g., lithium alumium hydride. Aminoalkylamine derivatives, e.g., aminopentylamine or diethyl aminobutylamine or monohexylaminopropylamine can be prepared from alkoxyalkylamine derivatives of dibenzocycloheptenes, that is, the products resulting from the reaction of compounds of Formula II with compounds of Formula III can be alkylated in a conventional manner with alkoxyalkyl groups to prepare 5-alkoxyalkylamino-5H-dibenzocycloheptenes. The alkoxy groups can then be replaced by halogen, e.g., by treatment with hydrohalic acid, e.g., hydrobromic acid, at boiling heat or with phosphorus oxychloride at reflux temperature. The resulting 5-haloalkylamine derivatives of dibenzocycloheptene can then be reacted with ammonia or suitable primary or secondary amines to prepare 5-aminoalkylamino derivatives. Suitable primary or secondary amines include, for example, lower mono- or dialkylamines such as methylamine, ethylamine, hexylamine, dimethylamine, diethylamine or dihexylamine. For example, a compound of Formula I wherein $R_1$ and $R_2$ are each hydrogen can be reacted with a compound of the formula

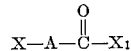

wherein X and $X_1$ are each halogen, e.g., fluorine, chlorine, bromine or iodine, preferably chlorine or bromine, and A is lower alkylene to prepare a compound of the formula

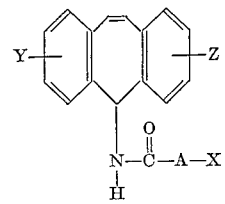

Compounds of Formula V can then be reacted with ammonia or suitable primary or secondary amines as indicated above. For example, reaction of compounds of Formula V with dimethylamine yields 5-dimethylaminoalkanoylamino-5H-dibenzo[a,d]cycloheptene. Hence, if A in the compound of Formula V were methyl, the product would be 5 - dimethylaminoacetylamino-5H-dibenzo[a,d]cycloheptene.

The products of the reaction of compounds of Formula II with compounds of Formula III can be readily isolated by known and conventional techniques. For example, the resulting reaction mixture can be evaporated, the residue dissolved in benzene and the desired reaction product extracted with acid, e.g., dilute hydrochloric acid.

The dibenzocycloheptene compounds so-obtained will form pharmaceutically acceptable acid addition salts with both inorganic and organic acids. For example, salts can be prepared by treatment of the reaction products with hydrohalic acids, e.g., hydrochloric acid, hydrobromic acid or with other mineral acids, e.g., sulfuric acid, phosphoric acid or nitric acid or with organic acids, e.g., tartaric acid, citric acid, oxalic acid, ethane-sulfonic acid, para-toluenesulfonic acid, maleic acid, mandelic acid, etc. The preferred salts are those formed from the hydrohalides especially the hydrochlorides. The pharmaceutically acceptable acid addition salts are preferably prepared by treatment of the base with the corresponding acid in an inert solvent. Salts with non-pharmaceutically acceptable acids can be converted into salts with pharmaceutically acceptable acids by neutralization followed by reaction with pharmaceutically acceptable acids or by conventional metathetic reaction.

As mentioned earlier the compounds of this invention are pharmaceutically useful, for example, as psychostimulants, and are particularly useful in reversing the effect of reserpine and in effecting a direct central nervous stimulant action. They can be administered either as the free base or in the form of their pharmaceutically acceptable acid addition salts or can be administered in a conventional pharmaceutical formulation. That formullation can contain an inert organic or inorganic pharmaceutical carrier suitable for enteral or parenteral application, e.g., water, gelatin, lactose, starch, magnesium stearate, talc, vegetable oils, gums, olein alcohols, Vaseline, etc. The pharmaceutical preparations can be administered in solid form, e.g., tablets, dragees, suppositories, or capsules or in liquid form, e.g., solutions, suspensions or emulsions. They may be sterilized and may contain additives for preserving their shelf life, e.g., antioxidants or stabilizing, wetting or emulsifying agents or salts for adjusting the osmotic pressure or buffers. Compounds of this invention can be combined with other therapeutically valuable materials in a variety of pharmaceutical preparations.

The present invention is further disclosed in the following examples, which are illustrative but not limitative thereof. All temperatures are in degrees centigrade.

EXAMPLE 1

10.6 gms. of 5 - chloro-5H-dibenzo[a,d]cycloheptene was dissolved in 60 ml. of toluene and the resulting solution was treated with 25 ml. of methylamine. The reaction mixture thus formed was then heated at 120° C. under a pressure of 20 atms. for a period of 20 hours. The reaction mixture was then concentrated under reduced pressure. The residue was dissolved in 2 N HCl and the neutral portion was extracted with benzene. On treatment of the acidic portion with concentrated caustic soda the base, 5 - methylamino-5H-dibenzo[a,d]cycloheptene was obtained. The base was then dissolved in chloroform, washed with water, dried and concentrated. The aforesaid crude base was converted into the hydrochloride by treatment with methanolic hydrochloric acid and was precipitated from solution with ether. 5-methylamino-5H-dibenzo[a,d]cycloheptene hydrochloride having a melting point of 234–235° C. was thus obtained.

EXAMPLE 2

20 gms. of 5-chloro-5H-dibenzo[a,d]cycloheptene was reacted with 150 ml. of n-propylamine at 120° C. under a pressure of 20 atms. for a period of 20 hours. The reaction mixture containing 5 - n-propylamino - 5H-dibenzo[a,d]cycloheptene was then evaporated under reduced pressure and further reacted with 2N hydrochloric acid and benzene. A crystalline precipitate of 5-n-propylamino-5H-dibenzo[a,d]cycloheptene hydrochloride was obtained. The hydrochloride was filtered under vacuum and washed with benzene. 5 - n-propylamino - 5H-dibenzo[a,d]cycloheptene hydrochloride was recrystallized once from methanol ether and melted at 220° C.

EXAMPLE 3

10 gms. of 5-chloro-5H-dibenzo[a,d]cycloheptene was reacted with 100 ml. of n-butylamine following the procedure recited in Example 2. 5-n-butylamino-5H-dibenzo[a,d]cycloheptene was converted to the hydrochloride by reaction with 2 N hydrochloric acid and benzene with stirring. A crystalline precipitate was obtained which was filtered off under vacuum, washed with benzene and recrystallized from methanol ether. The resulting product was 5-n-butylamino-5H-dibenzo[a,d]cycloheptene hydrochloride having a melting point of 216–217° C.

EXAMPLE 4

20 gms. of 5-chloro-5H-dibenzo[a,d]cycloheptene was reacted with 5 ml. of n-hexylamine at a temperature of 120° C. under a pressure of atms. for a period of 15 hours. Excess n-hexylamine was removed by evaporation and the residue after evaporation was then distilled under strongly reduced pressure. 5-n-hexylamino-5H-dibenzo[a,d]cycloheptene was obtained as a yellow viscous oil which boils at 170–175° C. at a pressure of 0.05 mm. Hg.

EXAMPLE 5

10 gms. of 5-chloro-5H-dibenzo[a,d]cycloheptene were dissolved in 100 ml. of benzene and the solution was then reacted wtih 5 gms. of benzoylamine at a reflux temperature (about 80° C.) for 3 hours to produce 5-benzoylamino - 5H-dibenzo[a,d]cycloheptene, 2 N-hydrochloric acid was added to the reaction mixture and the flask was then shaken to provide for thorough mixing. A precipitate of 5-benzoylamino-5H-dibenzo[a,d]cycloheptene hydrochloride was obtained, which, on recrystallization from methanol ether, gave a melting point of 209–210° C.

EXAMPLE 6

10 gms. of 5-chloro-5H-dibenzo[a,d]cycloheptene were dissolved in 100 ml. of benzene and reacted with 25 ml. of isopropylamine at a temperature of 120° C. under a pressure of 20 atms. for a period of 20 hours. The reaction mixture was then concentrated under reduced pressure. The residue was dissolved in 2 N HCl and the neutral portion was extracted with benzene. On treatment with concentrated caustic soda, the base 5-isopropylamino-5H-dibenzo[a,d]cycloheptene was obtained. The base was then dissolved in chloroform, washed with water, dried and concentrated. On treatment with methanolic hydrochloric acid, the base was converted into the hydrochloride and precipitated from solution with ether. On recrystallization from methanol ether 5 - isopropylamino-5H-dibenzo[a,d]cycloheptene hydrochloride having a melting point of 192–194° C. was obtained.

EXAMPLE 7

15 gms. of 5-chloro-5H-dibenzo[a,d]cycloheptene in 50 ml. of benzene was reacted with 50 ml. of tertiary butylamine at a temperature of 120° C. and under a pressure of 20 atms. for a period of 20 hours. The reaction mixture was then concentrated under reduced pressure. The residue was dissolved in 2 N HCl and the neutral portion was then removed by extraction with benzene. On treatment of the remaining hydrochloric acid solution with concentrated sodium hydroxide, the base 5-tertiary butylamino 5H - dibenzo[a,d]cycloheptene was set free. The base was then dissolved in chloroform, washed with water, dried and concentrated. The crude base was converted into the hydrochloride by treatment with methanolic hydrochloric acid and was precipitated from solution with ether. On recrystallization from methanol/ether, 5-tertiary butylamino - 5H-dibenzo[a,d]cycloheptene hydrochloride having a melting point of 225° C. was obtained.

EXAMPLE 8

40 gms. of 5-chloro-5H-dibenzo[a,d]cycloheptene was reacted with 100 ml. of 3-dimethylamino-propylamine at a temperature of 120° C. under a pressure of 20 atms. for a period of 20 hours. The reaction mixture was then concentrated under reduced pressure. The residue was dissolved in 2 N HCl and the neutral portion was extracted therefrom with benzene. On further treatment of the solution with concentrated sodium hydroxide, the base 5-3-dimethylaminopropylamino - 5H-dibenzo[a,d]cycloheptene was set free. The base, a brown viscous oil, was then dissolved in chloroform, washed with water, dried and concentrated by distillation under strongly reduced pressure. The pure base obtained was a yellow viscous oil boiling at 148–156° C./0.05 mm.

EXAMPLE 9

25 gms. of 5-chloro-5H-dibenzo[a,d]cycloheptene were reacted with 80 ml. of piperidine at a temperature of 120° C. and under a pressure of 20 atms. for a period of 12 hours. The excess of piperidine was removed by evaporation and the residue after evaporation was directly purified with aluminum oxide (activity grade II). The product was 5-piperidino-5H-dibenzo[a,d]cycloheptene and after recrystallization from methanol gave a melting point of 116–118° C. On further treatment with methanolic hydrochloric acid and precipitation from solution with ether 5-piperidino-5H-dibenzo[a,d]cycloheptene hydrochloride having a melting point of 180° C. was obtained.

EXAMPLE 10

20 gms. of 5-chloro-5H-dibenzo[a,d]cycloheptene was reacted with 150 ml. of 3-methoxy-propylamine at 120° C. and under the pressure of 20 atms. for a period of 12 hours. The excess of 3-methoxy-propylamine was evaporated off from the reaction mixture under reduced pressure. The residue was dissolved in chloroform, washed with water, dried and concentrated. The crude oily 5-3-methoxypropylamino-5H-dibenzo[a,d]cycloheptene was dissolved in ether. Hydrogen chloride gas was then passed into the reaction mixture to form 5-3-methoxypropylamino-5H-dibenzo[a,d]cycloheptene hydrochloride having a melting point of 198° C.

EXAMPLE 11

20 gms. of 5-chloro-5H-dibenzo[a,d]cycloheptene were dissolved in 250 ml. of chloroform, and gaseous dimethylamine was fed into the solution. The reaction mixture was concentrated after 5 hours, and the residue was dissolved in 2 N HCl. The neutral portion was then removed from the reaction mixture by extraction with benzene. The reaction mixture was then treated with concentrated sodium hydroxide to obtain 5-dimethylamino-5H-dibenzo[a,d]cycloheptene which, after recrystallization from methanol and water melted at 116–117° C. The base was converted into the hydrochloride with methanolic hydrochloric acid and was precipitated from solution with ether. After recrystallization from methanol/ether 5-dimethylamino-5H-dibenzo[a,d]cycloheptene hydrochloride was obtained having a melting point of 203–203.5° C.

EXAMPLE 12

To 20 gms. of 5-chloro-5H-dibenzo[a,d]cycloheptene was added 100 ml. of diethylamine and the reaction mixture was heated to a temperature of 120° C. under a pressure of 20 atms. for a period of 12 hours. The reaction mixture was then concentrated under reduced pressure and divided into two phases by the addition of water and chloroform. The aqueous phase was separated and adjusted to a pH of 12 with concentrated sodium hydroxide. 5-diethylamino-5H-dibenzo[a,d]cycloheptene was thus obtained as a red oil. The red oil was dissolved in benzene, purified on 200 gms. of aluminum oxide (activity grade II) and subsequently distilled under reduced pressure, boiling point at 0.05 mm. Hg is 125° C. The distillate crystallized upon cooling forming crystals which melted at 58–59° C.

EXAMPLE 13

To 5 gms. of 5-chloro-5H-dibenzo[a,d]cycloheptene was added 50 gms. of pure ammonia and the reaction mixture was heated to a temperature of 120° C. under a pressure of 20 atms. for a period of 20 hours. The reaction mixture was then concentrated under reduced pressure. The residue was dissolved in 2 N HCl, and the neutral portion was extracted with benzene. The reaction mixture was then treated with concentrated sodium hydroxide to obtain 5-amino-5H-dibenzo[a,d]cycloheptene, which was then dissolved in chloroform, washed with water, dried and concentrated. The crude base was converted into the hydrochloride by treatment with methanolic hydrochloric acid and was precipitated from solution with ether. After recrystallization from methanol and ether 5-amino-5H-dibenzo[a,d]cycloheptene hydrochloride having a melting point of 222–223° C. was obtained.

EXAMPLE 14

To 20 gms. of 5-chloro-5H-dibenzo[a,d]cycloheptene was added 50 ml. of morpholine and 30 ml. of benzene. The reaction mixture was heated to a temperature of 120° C. at a pressure of 20 atms. for a period of 12 hours. The reaction mixture was then concentrated under reduced pressure. The residue was dissolved in 2 N HCl and the neutral portion was extracted with benzene. On treatment with sodium hydroxide the base 5-morpholino-5H-dibenzo[a,d]cycloheptene was obtained and on recrystallization from ether had a melting point of 118°–119° C. On treatment with methanolic hydrochloric acid and precipitation from solution with ether 5-morpholino-5H-dibenzo[a,d]cycloheptene hydrochloride having a melting point of 181° C. was obtained.

EXAMPLE 15

20 gms. of 5-chloro-5H-dibenzo[a.d]cycloheptene was reacted with 60 ml. of amylamine at a reaction temperature of 120° C. and at a pressure of 20 atms. for a period of 4 hours. The reaction was then worked up according to the procedure given in Example 14 above, yielding 5-n-pentylamino-5H-dibenzo[a,d]cycloheptene. The aforesaid base was then dissolved in ether and hydrochloric acid was passed into the solution. A crystalline precipitate of 5-n-pentylamino-5H-dibenzo[a,d]cycloheptene hydrochloride having a melting point of 176–178° C. was obtained.

EXAMPLE 16

To 20 gms. of 5-chloro-5H-dibenzo[a,d]cycloheptene was added 80 ml. of N-methyl-propylamine and the reaction mixture was heated to a temperature of 120° C. under 20 atms. pressure for a period of 12 hours. The reaction mixture was then worked up according to the procedure given in Example 14 above, yielding 5-N-methyl-n-propyl-amino-5H-dibenzo[a,d]cycloheptene which was dissolved in ether. Hydrogen chloride gas was passed through the solution to yield 5-N-methyl-n-propyl-amino-5H-dibenzo[a,d]cycloheptene hydrochloride which, after recrystallization from acetone, melted at 150°–151° C.

EXAMPLE 17

To 25 gms. of 5-chloro-5H-dibenzo[a,d]cycloheptene was added 60 gms. of N-methyl-butylamine. The reaction mixture was heated to a temperature of 120° C. at a pressure of 20 atms. for a period of 12 hours. The reaction was then worked up according to the procedure given in Example 14 above, yielding crude 5-N-n-butyl-methlyamino - 5H - dibenzo[a,d]cycloheptene as an oily base. The crude base was converted into the hydrochloride by treatment with methanolic hydrochloric acid and was precipitated from solution with ether. 5-N-n-butylmethyl-amino-5H-dibenzo[a,d]cycloheptene hydrochloride thus obtained was recrystallized from acetone and melted at 149–151° C.

EXAMPLE 18

To 6.8 gms. of 5-amino-5H-dibenzo[a,d]cycloheptene in 200 ml. of benzene was added 5 ml. of triethylamine. The reaction mixture was then cooled and 2.6 ml. chloracetylchloride in 50 ml. of benzene was added dropwise into the cooled reaction mixture while stirring constantly. After a reaction time of 15 hours at room temperature, the reaction mixture, containing 5-chloracetyl-amino - 5H - dibenzo[a,d]cycloheptene, while constantly being kept cooled, was saturated with gaseous dimethylamine. The reaction mixture was then heated to reflux for a period of 2 hours. The mixture was then added to water and extracted with ethylacetate. After working up the reaction mixture in accordance with the procedure given in Example 14 above, 5-dimethylaminoacetylamino-5H-dibenzo[a,d]cycloheptene was obtained as an oily base. The crude oily base was purified by chromatography first on a bed of aluminum oxide (activity grade II), eluted with benzene and then eluted with methanol on silica gel. After recrystallization from methanol ether, 5 - dimethylaminoacetylamino - 5H - dibenzo[a,d]cycloheptene hydrochloride was obtained having a melting point of 204–205° C.

EXAMPLE 19

To 4.8 gms. of 5-amino-5H-dibenzo[a,d]cycloheptene was added 50 ml. of pyridine and 2.63 ml. of acetic anhydride. 5 - acetylamino - 5H-dibenzo[a,d]cycloheptene precipitated and was filtered off from the reaction mixture. The 5-acetylamino-5H-dibenzo[a,d]cycloheptene thus obtained had a melting point of 289–290° C.

EXAMPLE 20

To 16.5 gms. of 5-amino-5H-dibenzo[a,d]cycloheptene was added 250 ml. of ether and 12.1 gms. of triethylamine. To that mixture was added a solution containing 8.4 ml. of chloroformic acid ethyl ester in 50 ml. of ether. After stirring for 1 hour, the reaction mixture was evaporated to dryness, dissolved in ether acetate, treated with 2 N hydrochloric acid, saturated sodium carbonate solution and water and dried over sodium sulfate. 5- carbethoxyamino-5H-dibenzo[a,d]cycloheptene was obtained and after recrystallization from ethyl alcohol it had a melting point of 202–202° C.

EXAMPLE 21

20 g. of 5-chloro-5H-dibenzo[a,d]cycloheptene were heated with 30 ml. pyrrolidine under 20 atmospheres of nitrogen at 100° for 12 hours. The reaction mixture was dissolved in dichloromethane and treated with concentrated sodium hydroxide solution, washed with water, dried and evaporated. The crude base was further purified by chromatography on alumina in benzene solution and crystallized from acetone giving pure 5-pyrrolidono-5H-dibenzo[a,d]cycloheptene, melting at 132–133°.

EXAMPLE 22

100 grams of 5-n-butylamino-5H-dibenzo[a,d]cycloheptene hydrochloride, 150 gms. of finely divided silicic acid, 420 gms. of corn starch, 300 gms. of lactose and 50 gms. of talcum were intimately intermixed and the so-obtained mixture then pressed into tablets of 100 mgs. each.

EXAMPLE 23

100 gms. of 5-n-pentylamino-5H-dibenzo[a,d]cycloheptene hydrochloride, 150 gms. of finely divided silicic acid, 420 gms. of corn starch, 300 gms. of lactose and 50 gms. of talcum were intimately intermixed and the so-obtained mixture then pressed into tablets of 100 mgs. each.

EXAMPLE 24

50 gms. of 5-dimethylamino-5H-dibenzo[a,d]cycloheptene hydrochloride, 110 gms. of corn starch, 120 gms. of lactose and 20 gms. of talcum were intimately intermixed and the so-obtained mixture pressed into tablets of 300 mgs. each.

EXAMPLE 25

To a solution of 0.8 gms. of 5-n-butylamino-5H-dibenzo[a,d]cycloheptene hydrochloride in 100 ml. of distilled water there was added 0.8 gm. of methyl-p-hydroxybenzoate and 0.01 gm. of propyl-p-hydroxybenzoate. The resulting solution was filled in 2.2 ml. portions, under a nitrogen atmosphere, into ampuls.

What is claimed is:
1. 5-benzylamino-5H-dibenzo[a,d]cycloheptene.
2. 5 - (3-methoxy-propylamino)-5H-dibenzo[a,d]cycloheptene.
3. 5-acetylamino-5H-dibenzo[a,d]cycloheptene.

References Cited

UNITED STATES PATENTS

| | | | |
|---|---|---|---|
| 3,052,721 | 9/1962 | Bernstein et al. | 260—562 |
| 3,167,541 | 1/1965 | Vander Stelt | 260—239 |
| 3,309,404 | 3/1967 | Engelhardt | 260—556 |
| 3,332,977 | 7/1967 | Wendler | 260—456 |

FOREIGN PATENTS

| | | |
|---|---|---|
| 1,012,619 | 12/1965 | Great Britain. |
| 6,500,085 | 7/1965 | Netherlands. |

OTHER REFERENCES

Winthrop et al.; J. Org. Chem. vol. 27 pp. 230–240.

HENRY R. JILES, Primary Examiner

G. T. TODD, Assistant Examiner

U.S. Cl. X.R.

260—247, 247.1, 247.7, 251, 268, 293, 293.4, 294, 294.7, 309, 310, 326.5, 326.81, 556, 571, 999, 573, 576